Sept. 13, 1927.  J. A. HAND ET AL  1,642,367
DENTAL LIGHT
Filed July 15, 1925   2 Sheets-Sheet 1

INVENTORS
Jay A. Hand
Chauncey R. Pelton
BY
Stuart C. Barnes
ATTORNEY

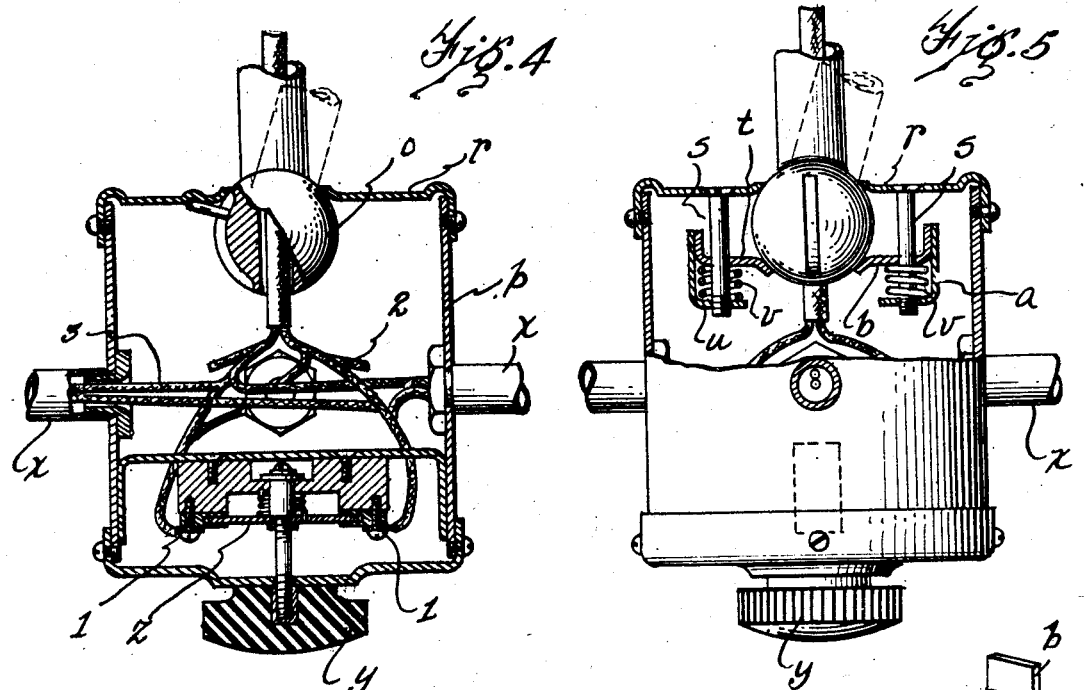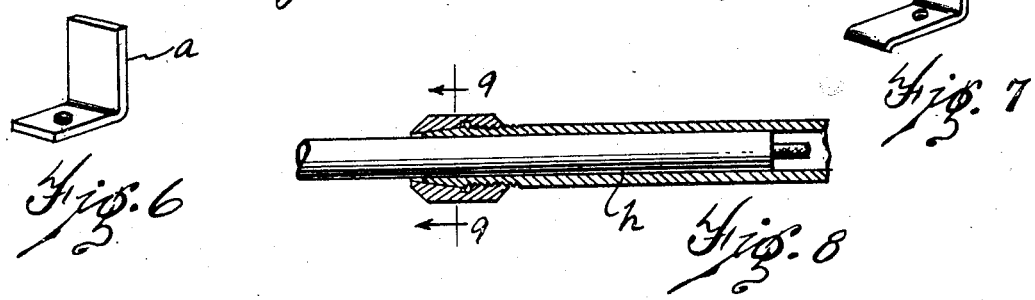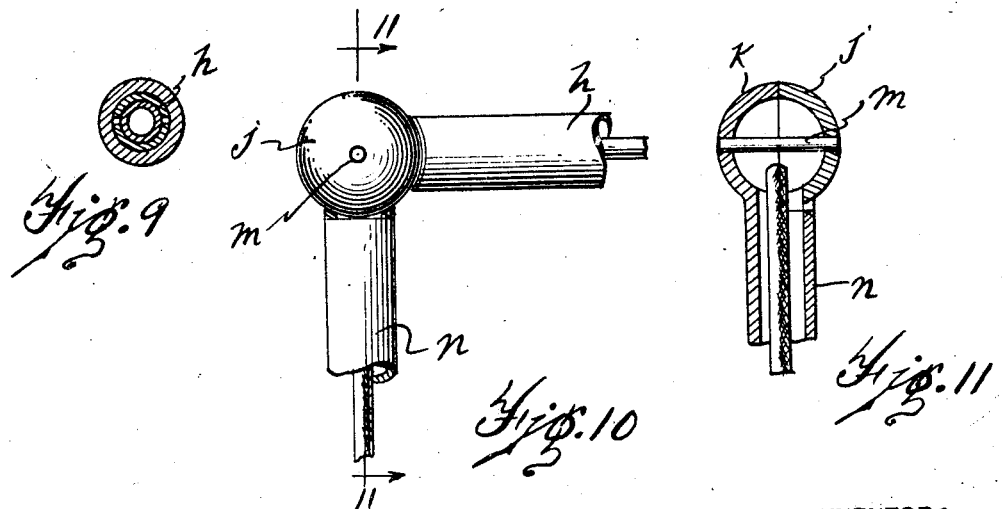

Patented Sept. 13, 1927.

1,642,367

UNITED STATES PATENT OFFICE.

JAY A. HAND AND CHAUNCEY R. PELTON, OF DETROIT, MICHIGAN, ASSIGNORS TO THE PELTON & CRANE COMPANY, OF DETROIT, MICHIGAN, A CORPORATION OF MICHIGAN.

DENTAL LIGHT.

Application filed July 15, 1925. Serial No. 43,782.

This invention relates to dental lights and has for its object a fixture arranged to support a cluster of lights in almost any position and at any angularity within a given range.

In dental work it is found that the cluster system of illumination is most satisfactory for the dentist in working on a patient's mouth, but so far as we are aware no means has ever been provided to nicely locate the cluster of lights to the position most desirable for the dentist in each particular operation.

In the drawings:

Fig. 4 is a section through the hub of the spider that supports the cluster of lights.

Fig. 5 is a part elevation and part section through the same parts but 90 degrees removed.

Figs. 6 and 7 are details of the device by which friction is applied to the ball which suspends the hub.

Fig. 8 is a detail of the telescoping rod.

Fig. 9 is a section taken on the line 9—9 of Fig. 8.

Figs. 10 and 11 are details of the support for the cluster at the outer ends of the telescoping rod.

A wall plate $a$ is provided with a sleeve $b$ which supports the cylinder $c$ in which slides the plunger $d$ which has the roller $e$ on the upper end; the strong spring $f$ resists the downward movement of this plunger, the upper end of the cylinder carries a yoke $g$ which forms a pivotal support for the two-part telescoping rod $h$. This is provided with the follower $i$ on the bottom of the rod, which is arranged to bear against the roller $e$. The telescoping rod, together with the weight that it suspends and the moment thereof is such that the plunger and spring just about counterbalances it. In fact the plunger with the spring is a counterbalancing device which is nicely calculated so that the resistance of the spring together with the friction of the parts is calculated to retain the arm or two-part telescoping rod in any given position to which it is either depressed or raised.

Figure 1:
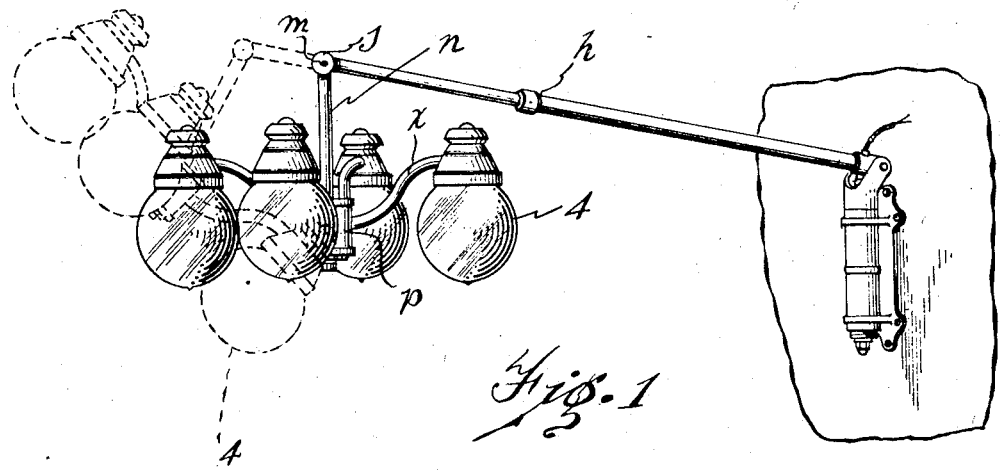
Fig. 1 is a perspective of the fixture attached to the wall.
Figure 2:
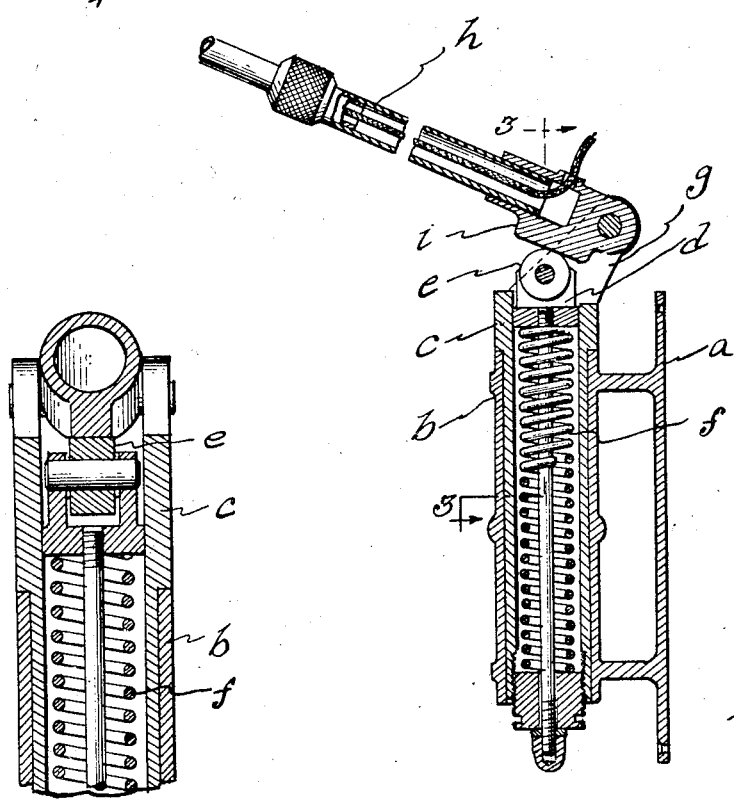
Fig. 2 is a vertical section of the wall supporting bracket.
Figure 3:
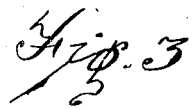
Fig. 3 is a fragmentary vertical section of the same part taken in a position 90 degrees removed, and indicated by the section lines 3—3 of Fig. 2.

Obviously the telescoping arrangement permits the cluster of lights to be drawn out or pressed in toward the wall as the demands of the occasion dictate. On the end of the two-part arm $h$ is a knee-joint made by holding the two half spheres $j$ and $k$ together with a pin $m$; this is riveted together tightly enough so that there is considerable friction and hence the hanger rod $n$ will stay in any position in which it is set; this is shown by the dotted lines of Fig. 1.

This hanger rod is provided at its end with a ball $o$ that is fitted into the hub casing $p$ by the removable cap $r$. A pair of studs $s$ enter the hub through the cap and have on their ends friction shoes $t$ and abutment plates $u$ spaced with the coil springs $v$. The abutment plates $u$ are secured to the ends of the studs $s$ by a screw thread. Obviously, when the ball joint is entered into the top of the hub casing and secured thereto by the cap plate $r$, the hub of the spider is supported on the hanger rod by means of a ball and socket friction joint. This will permit the hub, together with the spider arms $x$ to be tilted at any angle within a given range, not only in one plane, but in an infinite number of planes so that the action is a ball-and-socket joint action, or a universal joint. The friction serves to hold the cluster in any given position of adjustment.

$y$ designates a switch button that operates the switch arm $z$, arranged to engage or disengage the terminals 1, to connect with the leading-in wires 2. The other cords 3 lead through the spider arms to the incandescent lights contained within the globes 4; these globes are preferably holophane shades.

What we claim is:

1. In a lighting fixture for the purpose specified, the combination of a hanger member, a cluster of lights supported on the end of the hanger member by a ball-and-socket joint, a spring friction device co-operating with said ball-and-socket joint for supplying the friction necessary to hold the cluster of lights in any given position of adjustment, a telescoping rod, means for pivotally connecting said hanger to said rod and frictionally maintaining the hanger in any adjusted position, and a rotatable counterbalancing device for supporting and maintaining said rod in any adjusted position.

2. In a lighting fixture for the purpose specified, the combination of a hanger member provided at its lower end with a ball, and a light cluster provided with a plurality of hollow spider arms running into a hub casing at the center, said hub casing containing spring pressure devices adapted to bear against the ball to afford friction to hold the light cluster in any given position of adjustment of the ball.

3. In a lighting fixture for the purpose specified, the combination of a hanger member provided at its lower end with a ball, a light cluster provided with a plurality of hollow spider arms running into a hub casing at the center, said hub casing containing spring pressure devices adapted to bear against the ball to afford friction to hold the light cluster in any given position of adjustment of the ball, electric conducting wires contained in the casing, and a switch containined in the casing below the ball joint for controlling the passage of current through said conducting wires.

4. In a lighting fixture for the purpose specified, the combination of a wall bracket, a rotatable cylinder containing therein a plunger, a resisting spring contained within the cylinder, and a light-supporting arm pivotally supported on the top of the cylinder and provided with a portion adapted for connection with the plunger whereby the plunger tends to counterbalance the arm and retain it in a given position of adjustment.

5. In a lighting fixture for the purpose specified, the combination of a pivoted hanger member, a cluster of lights having a supporting hub, means within said hub for universally connecting said cluster and hanger and maintaining said cluster in any position of adjustment, and a rotatable counterbalancing device for pivotally supporting and maintaining the said hanger in any adjusted position.

6. A light fixture for dental and like purposes, comprising a supporting arm, a hanger rod, means for mounting the arm on a wall, said means including a member which permits the arm to be adjusted to different positions, a plurality of lights forming a cluster in which the lights are rigid with respect to each other, and means connecting the cluster to the rod, said means including a universal joint connection whereby the cluster can be tiltably adjusted as a unit with respect to the supporting rod.

7. In a lighting fixture for the purpose specified, the combination of a pivoted hanger member, a cluster of lights having a supporting hub, means within said hub for universally connecting said cluster and hanger and maintaining said cluster in any position of adjustment, and a counterbalancing device for pivotally supporting and maintaining the said hanger in any adjusted position.

In testimony whereof we have affixed our signatures.

JAY A. HAND.
CHAUNCEY R. PELTON.